United States Patent [19]

Neidenberger

[11] Patent Number: 5,755,184
[45] Date of Patent: May 26, 1998

[54] PET EXERCISER AND TOY DEVICE

[76] Inventor: Herbert W. Neidenberger, 9910 E. 16th St., Indianapolis, Ind. 46229

[21] Appl. No.: 608,528

[22] Filed: Feb. 28, 1996

[51] Int. Cl.$^6$ .................................................. A01K 15/00
[52] U.S. Cl. ................................ 119/707; D30/160
[58] Field of Search ........................... 119/702, 703, 119/705, 707, 708; D30/156, 160; D21/100

[56] References Cited

U.S. PATENT DOCUMENTS

| | | | |
|---|---|---|---|
| D. 38,825 | 11/1906 | Timmins | D21/100 |
| D. 259,354 | 5/1981 | Derrington | D21/100 |
| D. 284,487 | 7/1986 | Pratt | D21/100 |
| D. 298,871 | 12/1988 | Killen | D30/160 |
| D. 309,964 | 8/1990 | Viner et al. | D30/160 |
| D. 318,150 | 7/1991 | Eitel et al. | D30/160 |
| 4,940,018 | 7/1990 | Edling | 119/708 |
| 4,960,075 | 10/1996 | Klatt | 119/707 |
| 5,575,241 | 11/1996 | Line | 119/708 |

OTHER PUBLICATIONS

"Cat–Aerobics Exercise Program Instructions", Sun Rae Products, 1990, p. 5.

Advertising Supplement to Washington Post, "Feline Flyer Gift Pack" by Cat Claws, Dec. 8, 1995.

*Primary Examiner*—John G. Weiss
*Assistant Examiner*—David J. Cho
*Attorney, Agent, or Firm*—Daniel L. Boots; Bingham Summers Welsh & Spilman

[57] ABSTRACT

A Pet Exerciser and Toy Device consisting of an Attractor made of brightly colored silicone rubber strips attached to a high tensile strength steel Wire Member which is in turn embedded into a Handle Member that is manipulated by a human hand to entice the pet to attack. This device uses the pet's natural instincts of stalking, pouncing, leaping, and rebounding to provide much needed exercise to seldom used muscles. This also allows the pet and human to reaffirm their relationship in a positive manner.

13 Claims, 2 Drawing Sheets

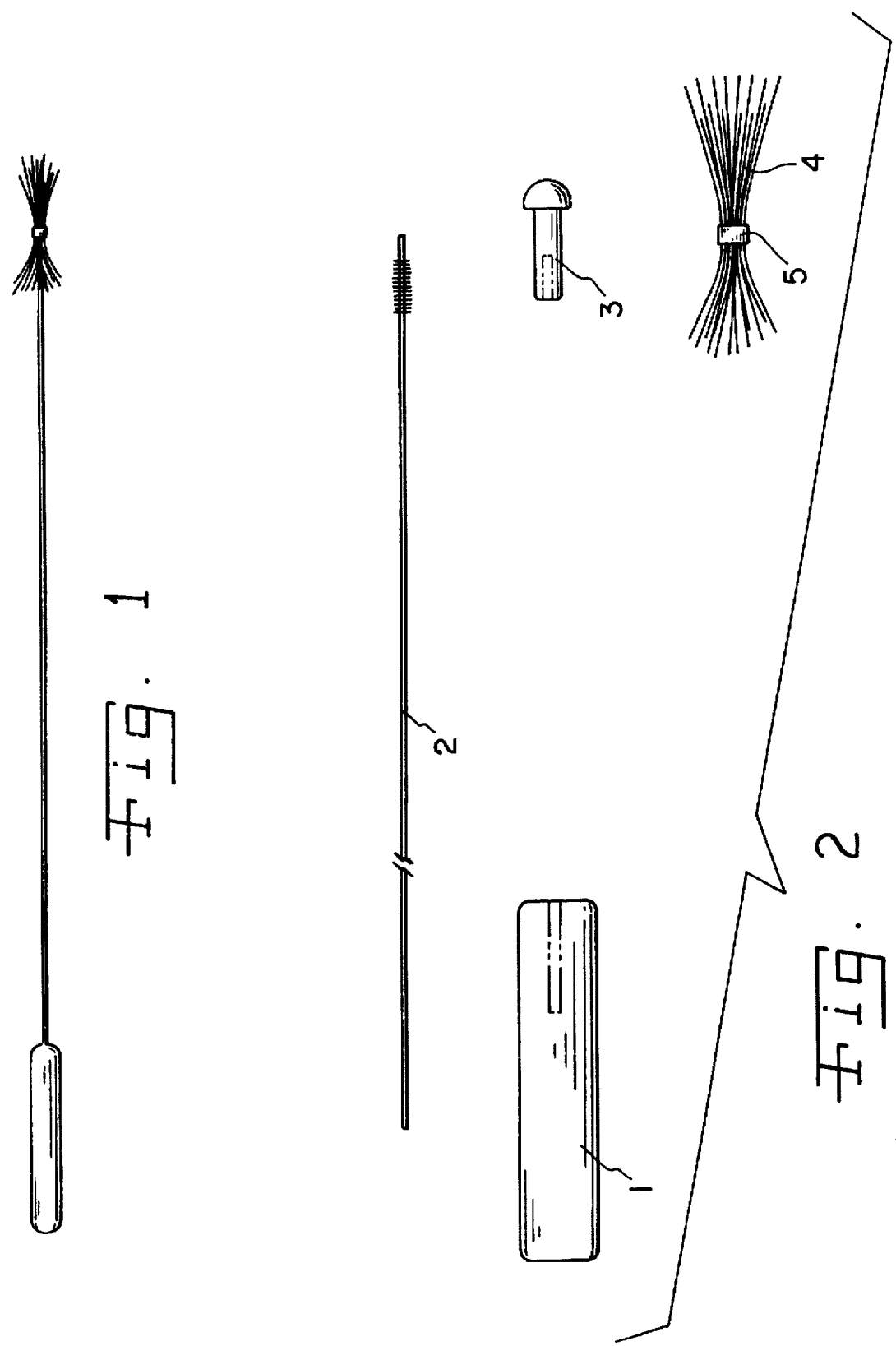

PET EXERCISER AND TOY DEVICE

BACKGROUND OF THE INVENTION

Today's modern house cat often suffers problems similar to his master, namely obesity, listlessness and heart disease. These conditions are due to improper diet and lack of proper exercise. The cat, being locked in a house or apartment all day, most often alone, does not get a chance to develop or tone his muscles. He not only has inherited the predatory killer instincts of his ancestors, but also the same muscular development. Walking or running does not tone the muscles used in predatory movements that are still part of his nature. Quick, spontaneous, fluid movements are needed to tone these muscles and fine tune these instinctive skills. These instincts often manifest themselves in the cat's aptitude to play by jumping at, pouncing on, clawing at and, in short, attacking small, quick moving, colorful objects that resemble small prey that move within the cat's field of vision.

It has been common practice to use bits and pieces of string, small bundles of cloth, strips of plastic, and even paper, as an attractor.

The disadvantage of such materials is they may become caught in the cat's claws or teeth, they may cause paper cuts to gums or paw pads, or even cause digestive problems if chewed or swallowed.

PRIOR ART

There have been many attempts over the years to provide a toy that would entertain while providing some measure of exercise for the pet. Examples of such toys would be: U.S. Pat. No. 4,960,075 issued to L. F. Klatt on Oct. 02, 1990. This discloses a cat toy being comprised of a stiff handle, such as a dowel rod, a switch member of a single piece of plastic material that is slitted and attached to said handle. The device is moved quickly in front of the cat. U.S. Pat. Des. No. 298,871 awarded to J. C. Killen on Dec. 06, 1988, illustrates a cat toy that is made up of two (2) balls comprised of several discs attached at the center axis, attached to either end of a rod of undetermined material or radius. This too would be waved in front of the animal to entice it to play.

John Galkiwicz, in his U.S. Pat. No. 4,499,855 awarded on Feb. 19, 1985, illustrates an apparatus comprising of a handle to which a tapering rod is attached that has a cord affixed at the tip with a target member tied to the loose end of the cord. He offers the suggestion that alternate materials, such as a soft ball, colored ribbon, or soft cultured mouse, may be used as a target material. This article reminds one of a buggy-whip with an item tied to the loose end.

While each of the above are operated by the human hand and have similar components, such as a handle, a shaft or rod, and some form of attractor attached, and each provides some form of exercise for the animal involved, any similarities with the present invention end there.

SUMMARY OF THE INVENTION

The present invention is a pet exerciser and toy device which is manipulated by a human being for a small animal such as a puppy, kitten, or cat.

The toy is comprised of a handle of wood or plastic fashioned in a shape suitable for gripping by the human hand, a flexible music wire attached to the handle at one end, an attachment member attached to the opposing end of the wire, and an attractor consisting of forty (40) to forty-five (45) strands of thin silicone strips gathered and held at the center by a rubber band. This skirt is not unlike those available for spinner bait fishing lures. The attractor is affixed to the attachment member by means of a rubber band which surrounds the attachment member as well as the silicone strips.

The wire used in the present invention is many times more flexible than the above-mentioned shafts and rods of previous art, thus taking better advantage of certain laws of physics such as momentum, action versus reaction, etc. This provides much faster reaction time, better response, more variable and erratic movements. These quicker movements stimulate faster responses from the pet which cause different muscle involvement than previous art. The present art is also designed to be a great deal safer for the animal than previous inventions. The silicone rubber skirt lure used as an attractor will not get caught on claws or teeth, will not cut soft tissue, and will completely and harmlessly pass through the animal's digestive system if accidentally chewed and swallowed.

The device is operated when a human being holds the handle comfortably in the palm of his hand and gently, by wrist action, moves the handle to cause the attractor to move erratically and thereby attracting the attention of the animal. Different movement and reaction of the attractor can be obtained by changing the manipulation of the handle.

For example, allowing the attractor to touch the floor and by wrist action moving the handle up and own causes the attractor to bounce and jump around on the floor. Moving the entire arm, while still moving the wrist in said manner, in a sweeping motion adds to the action of the attractor, which then resembles small moving prey.

By raising the attractor several inches above the floor and by wrist action moving the handle in any direction then to the opposing direction, causes the attractor to jerk about in midair, resembling a small bird or large insect in flight.

The flexing of the wire and the weight of the silicone skirt causes the attractor to move and before the momentum can be completed, the attractor is jerked in an opposing direction. Changing the speed and motion of the wrist makes the reaction of the attractor more erratic and less predictable. Since the attractor is moving quickly in front of the pet, a quick and spontaneous reaction is required in order for the pet to catch the attractor. This requires an instant change of direction and thus a more thorough workout of the animal's reflexes and of the different muscles involve in such predatory movements.

Accordingly, it is the object of the present invention to provide an inexpensive Pet exerciser and toy device that will stimulate muscle tone and cardiovascular workout of the puppy, cat, or kitten, while providing entertainment and interaction between the animal and the human operator.

Furthermore, it is the object of the invention to do so using the safest construction and materials that are available.

BRIEF DESCRIPTION OF THE DRAWINGS

The aforementioned features can be better understood by consideration of the following description of the accompanying drawings.

FIG. 1 is a side view of a pet exerciser.

FIG. 2 is an exploded side of a pet exerciser and toy device.

DETAILED DESCRIPTION OF PREFERRED EMBODIMENTS

Figure 3:
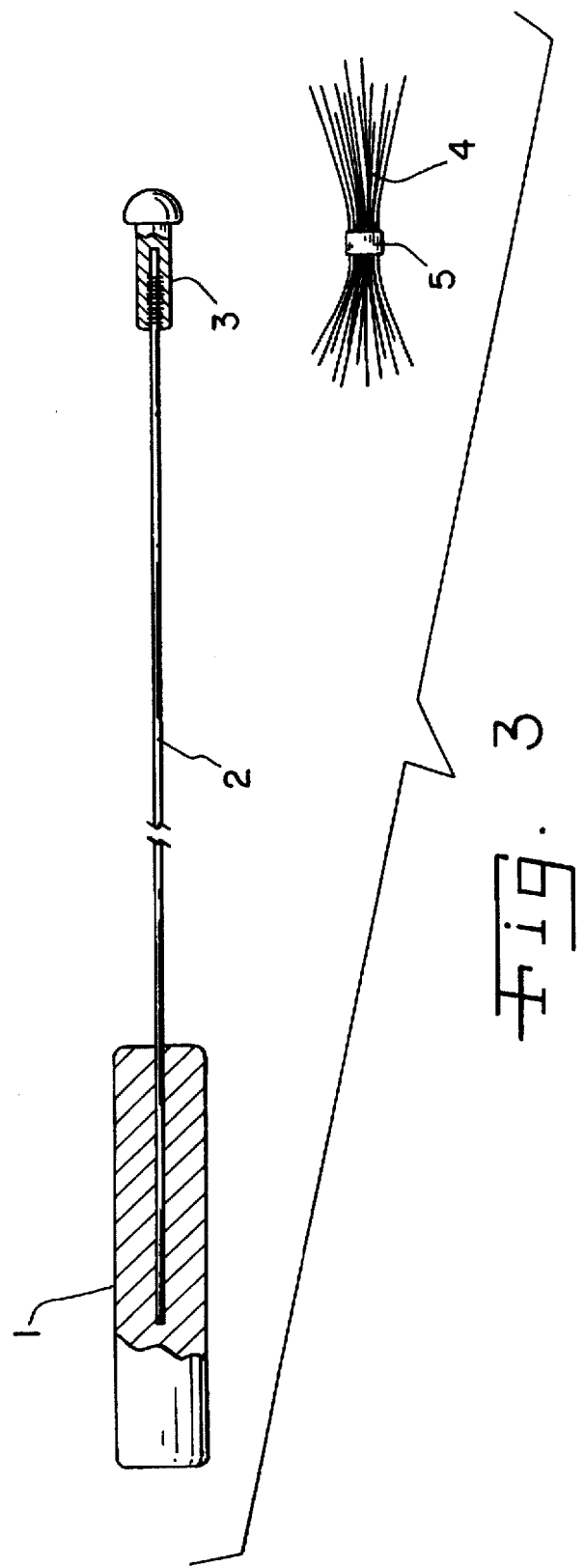
FIG. 3 is a detailed view of the component parts and their relationship to each other of a pet exerciser and toy device according to present invention.

The drawings depict a pet exerciser and toy device comprised of a handle member (1) typically hardwood or plastic, with a wire member (2) approximately 0.047 to 0.055 in diameter embedded and glued into the handle member (1) approximately ⅔ the length of the handle member (1). The opposing end of the wire member (2) which can be wrapped with nylon thread using the same wrapping and gluing technique used to wrap fishing rod eyelets starting about ⅓ the length of the attachment member (3) length from the end of the wire member (2) and wrapped around the wire member (2) another distance of about ⅓ the length of the attachment member (3) and then is embedded and glued into the attachment member (3). Said attachment member (3) being a wooden rod commonly referred to as a wooden toy axle or axle peg, which has a mushroom like head on one end and a shaft or rod like shape on the opposite end which has been predrilled to receive said wire member (2). The thin silicone rubber strips of the attractor (4) are gathered and held together at their center by a elastic means (5), such as a rubber band, (5) which also holds them to the attachment member (3). The strips and elastic means may be purchased, already made up, in sport goods stores as silicone rubber "skirts" for spinner bait fishing lures. This makes replacement skirts readily available.

I claim:

1. A pet exerciser and toy device for small animals, said device being operable by a human being and comprising:

a handle member having a first end and a second end;

a high tensile strength wire member having a base end and a connecting end, said based end being attached to the first end of said handle member;

an attachment member secured to the connecting end of said wire member; and an attractor secured to said attachment member, said attractor comprising a plurality of thin polymeric strips, said base end of the wire member being embedded and secured into the first end of said handle member and the connecting end of said wire member being embedded and secured into said attachment members, said attachment member comprising a wooden rod, and said wooden rod having a head end and a shaft end, said head end having a mushroom shape, said shaft end having a hole of approximately the same diameter as said wire member, said hole being drilled into the shaft end to about ⅓ the shaft's length to receive the connecting end of said wire member, said attachment member being driven and secured onto the connecting end of said wire member.

2. The pet exerciser and toy device of claim 1 wherein said attractor is detachably secured to said attachment member such that said attractor may be replaced as needed.

3. The pet exerciser and toy device of claim 1 wherein said handle member is suitably shaped for gripping and manipulation by a human operator, said wire member being substantially longer than said handle member and having a flexibility which varies in an erratic manner between said base end and said connecting end, said plurality of thin polymeric strips defining said attractor being gathered and bound near the center of their lengths.

4. The pet exerciser and toy device of claim 1 wherein said handle member is shaped to be comfortably held in the human hand for manipulation and includes a pre-drilled hole having an approximate diameter of said wire member, said pre-drilled hole extending to a depth of about ⅓ the length of said handle member to receive therein the base end of said wire member, said base end being driven and secured into said handle member.

5. The pet exerciser and toy device of claim 1 wherein said attractor further comprises about forty (40) to forty-five (45) thin silicone rubber strips, said strips being of such size and consistency to harmlessly pass through an animal's intestinal tract if swallowed, and further being bound together at the center of their lengths and secured to said attachment member by an elastic member.

6. The pet exerciser and toy device of claim 5 wherein said elastic member comprises a rubber band.

7. The pet exerciser and toy device of claim 1 wherein said polymeric strips are removably secured to said attractor by an elastic member.

8. A pet exerciser and toy device for small animals, said device being operable by a human being and comprising:

a handle member having a first end and a second end;

a wire member having a base end and a connecting end, said base end being attached to the first end of said handle member;

an attachment member comprising a wooden rod having a mushroom-shaped head end and a shaft end, said shaft end being secured to the connecting end of said wire member; and a replaceable attractor removably secured to said attachment member, said attractor including a plurality of thin polymeric strips, said shaft end of the attachment member having a pre-drilled hole of about the same diameter of said wire member to about ⅓ the shaft's length for receiving the connecting end of said wire member.

9. The pet exerciser and toy device of claim 8 wherein said wire member comprises a high tensile strength wire having a base end, and wherein the connecting end of said wire is secured to said attachment member.

10. The pet exerciser and toy device of claim 8 wherein said handle member is suitably shaped for gripping and manipulation by a human operator, the connecting end of said wire member being attached to said attachment member, said wire member being substantially longer than said handle member and having a flexibility which varies in an erratic manner between said base end and said connecting end, said thin polymeric strips of said attractor being bound near the center of their lengths.

11. The pet exerciser and toy device of claim 8 wherein said handle member is shaped to be comfortably held in the human hand for manipulation and includes a pre-drilled hole having an approximate diameter of said wire member, said pre-drilled hole receiving therein the base end of said wire member, said based end of the wire member being driven and secured into said handle member.

12. The pet exerciser and toy device of claim 8 wherein said attractor further comprises about forty (40) to forty-five (45) thin silicone rubber strips, said strips being of such size and consistency to harmlessly pass through an animal's intestinal tract if swallowed, and further being gathered and banded together at the center of their lengths and secured to said attachment member by an elastic member.

13. The pet exerciser and toy device of claim 8 wherein said plurality of thin polymeric strips is removably secured to said attractor by elastic means.

* * * * *